United States Patent
Yamazaki

(10) Patent No.: US 11,987,119 B2
(45) Date of Patent: May 21, 2024

(54) DEVICE, METHOD, AND PROGRAM FOR TIRE FAILURE DETECTION, AND COMPUTER-READABLE RECORDING MEDIUM RECORDING TIRE FAILURE DETECTION PROGRAM

(71) Applicant: VOLVO TRUCK CORPORATION, Gothenburg (SE)

(72) Inventor: Hiroo Yamazaki, Saitama (JP)

(73) Assignee: VOLVO TRUCK CORPORATION, Gothenburg (SE)

( * ) Notice: Subject to any disclaimer, the term of this patent is extended or adjusted under 35 U.S.C. 154(b) by 908 days.

(21) Appl. No.: 16/977,297

(22) PCT Filed: Mar. 2, 2018

(86) PCT No.: PCT/JP2018/008059
§ 371 (c)(1),
(2) Date: Sep. 1, 2020

(87) PCT Pub. No.: WO2019/167264
PCT Pub. Date: Sep. 6, 2019

(65) Prior Publication Data
US 2021/0001721 A1    Jan. 7, 2021

(51) Int. Cl.
*B60K 28/16* (2006.01)
*G01B 21/22* (2006.01)
*G01M 17/02* (2006.01)
*G07C 5/00* (2006.01)

(52) U.S. Cl.
CPC .............. *B60K 28/16* (2013.01); *G01B 21/22* (2013.01); *G01M 17/02* (2013.01); *G07C 5/008* (2013.01)

(58) Field of Classification Search
None
See application file for complete search history.

(56) References Cited

U.S. PATENT DOCUMENTS

| 6,374,172 B1 | 4/2002 | Yamaguchi et al. |
| 2004/0019417 A1* | 1/2004 | Yasui ............ B60T 8/172 701/80 |
| 2006/0156790 A1 | 7/2006 | Bocquillon et al. |
| 2008/0059034 A1 | 3/2008 | Lu |

(Continued)

FOREIGN PATENT DOCUMENTS

| EP | 1512598 A1 | 3/2005 |
| JP | 10-281944 A | 10/1998 |
| WO | 2006001255 A1 | 1/2006 |

OTHER PUBLICATIONS

International Search Report and Written Opinion dated May 15, 2018 in corresponding International PCT Application No. PCT/JP2018/008059, 5 pages.

(Continued)

*Primary Examiner* — Tamara L Weber
(74) *Attorney, Agent, or Firm* — Venable LLP; Jeffri A. Kaminski

(57) ABSTRACT

A tire failure detection device includes a steering angle sensor for sensing a steering angle, a yaw rate sensor for sensing a yaw rate, and a control unit. The control unit calculates side-slip energy based on the output signal of the steering angle sensor and the output signal of the yaw rate sensor, and determines that a failure has occurred in a tire when the side-slip energy exceeds a first threshold.

17 Claims, 10 Drawing Sheets

(56) References Cited

U.S. PATENT DOCUMENTS

| | | | |
|---|---|---|---|
| 2014/0277926 A1* | 9/2014 | Singh | B60C 23/06 701/34.4 |
| 2017/0102293 A1* | 4/2017 | Singh | B60W 40/12 |
| 2017/0113494 A1 | 4/2017 | Singh et al. | |

OTHER PUBLICATIONS

European Search Report dated Sep. 23, 2021 in corresponding European Patent Application No. 18907797.7, 7 pages.

* cited by examiner

[Fig. 1]
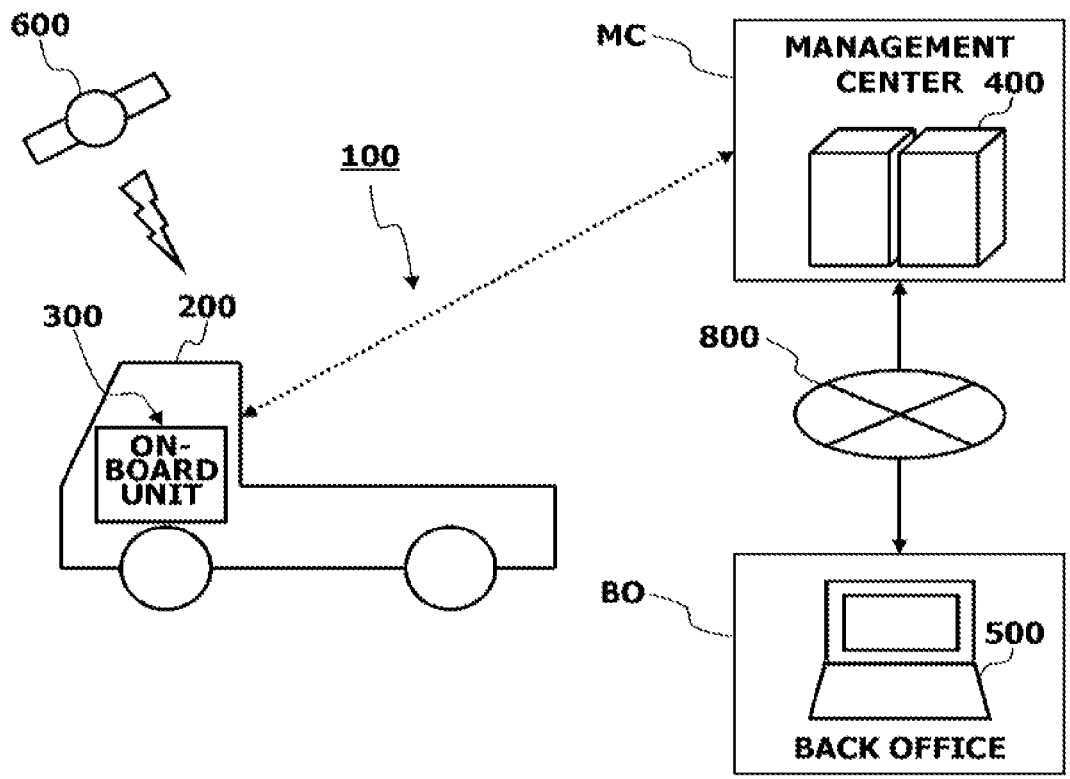
[Fig. 2]
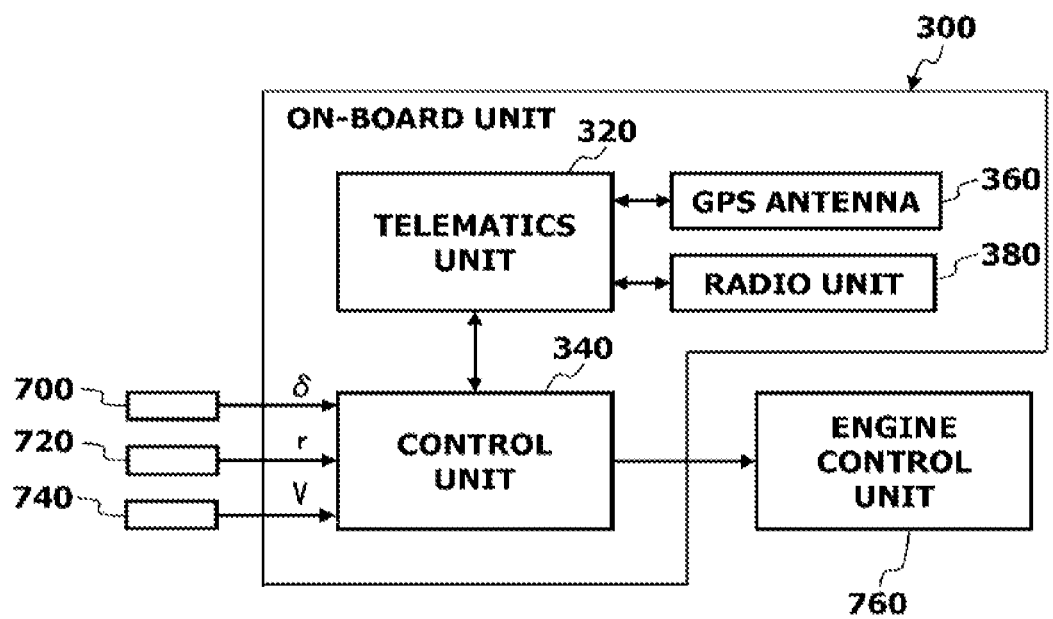

[Fig. 3]
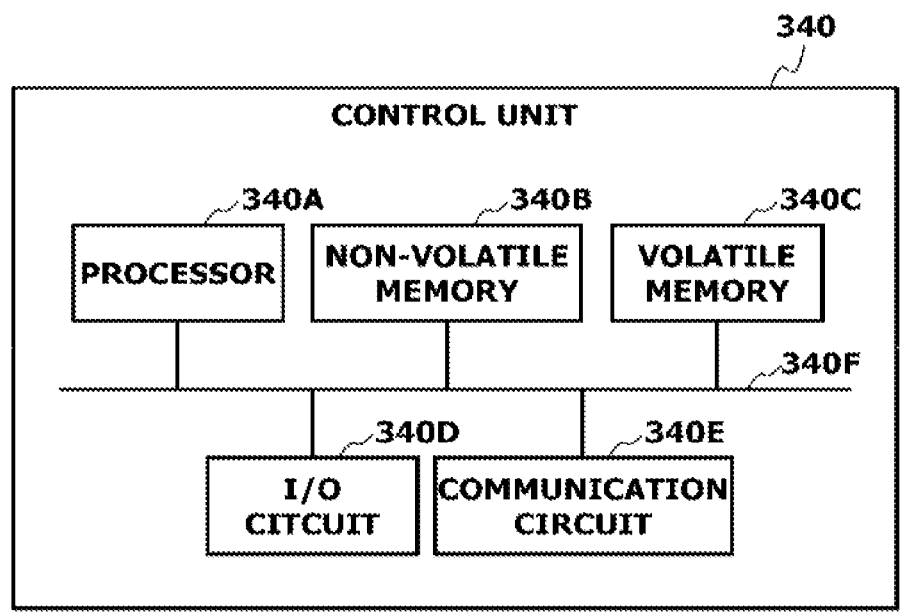
[Fig. 4]
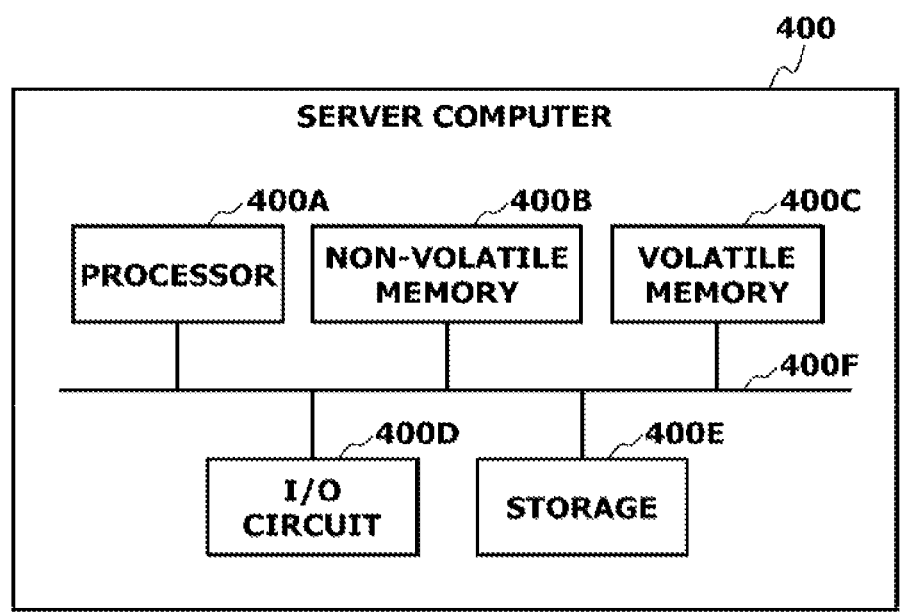

[Fig. 5]
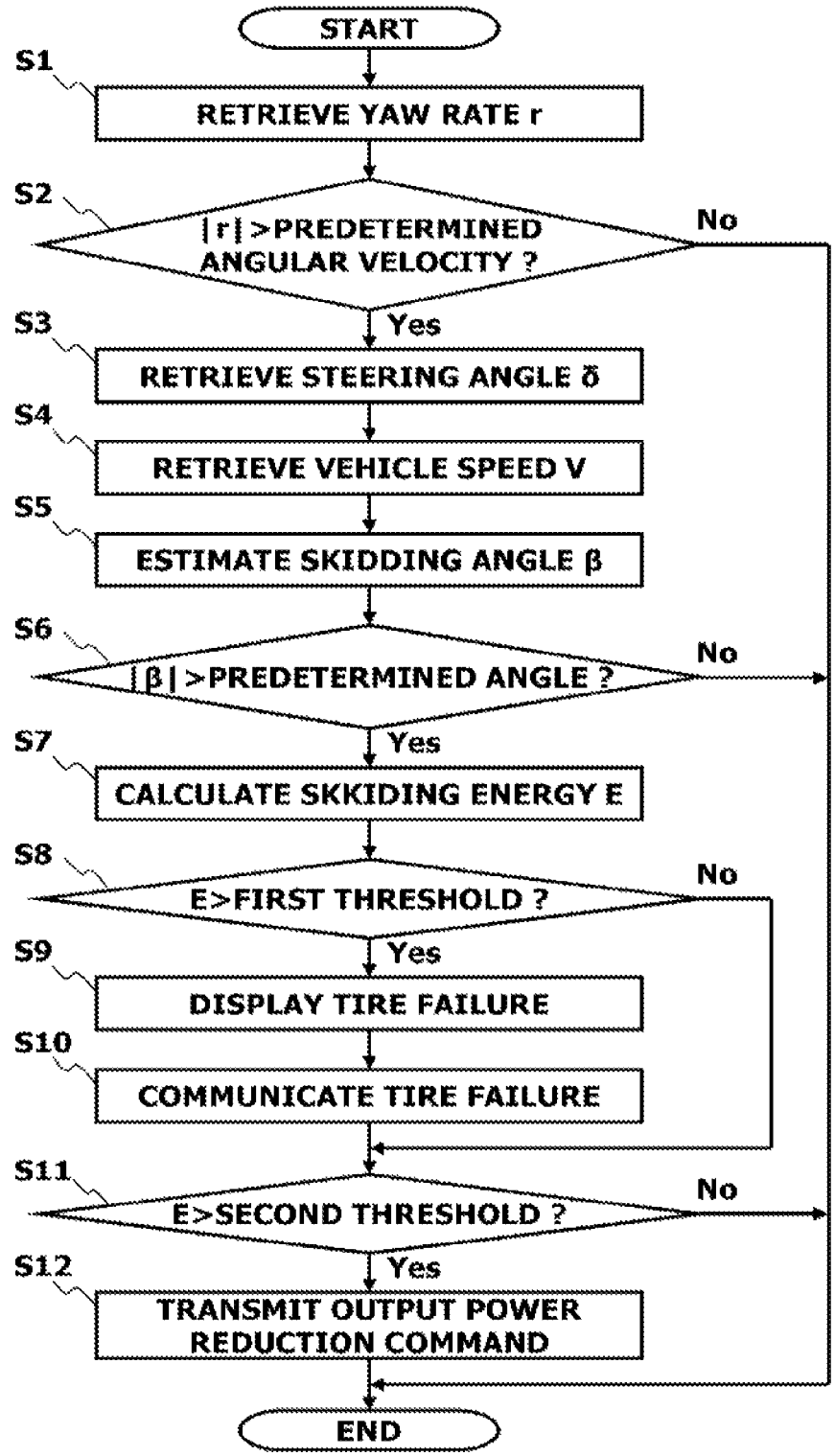

[Fig. 6]
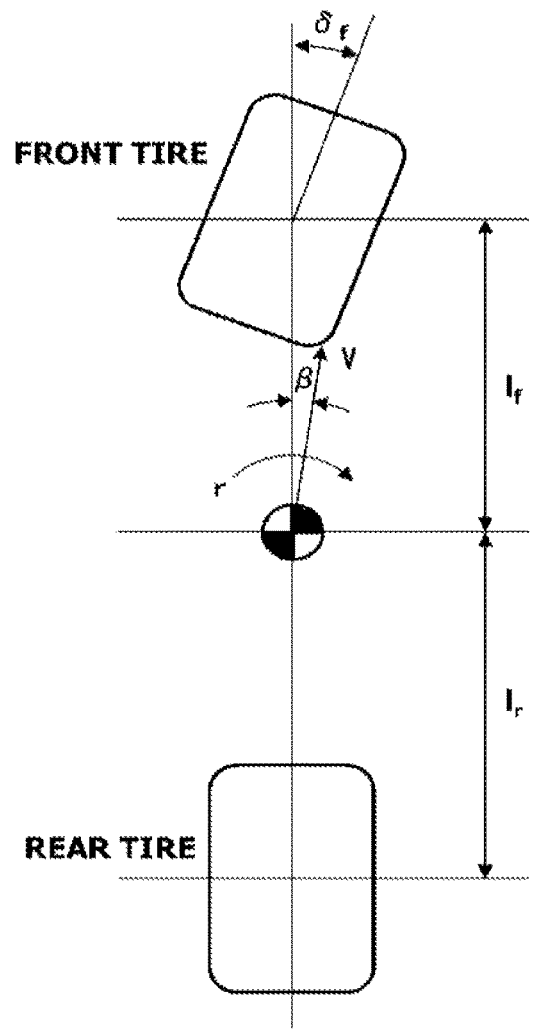
[Fig. 7]
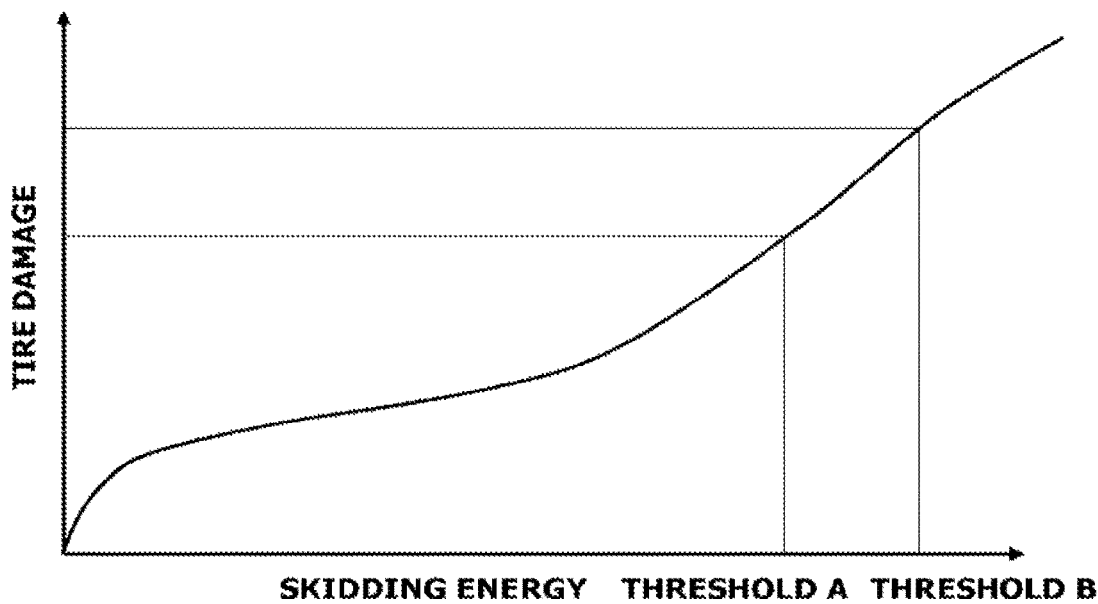

[Fig. 8]
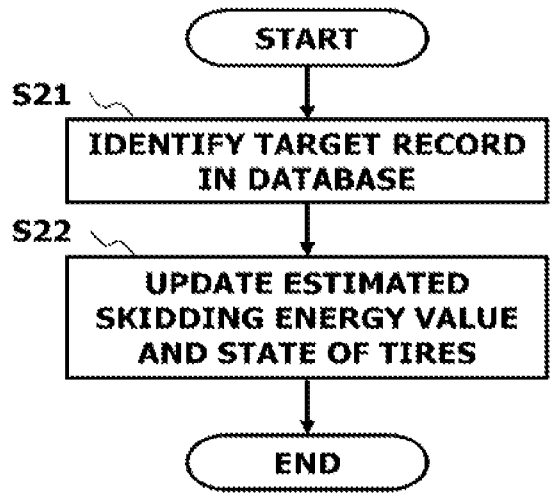
[Fig. 9]
| VEHICLE | TIRE TYPE | THRESHOLD | ESTIMATD VALUE | STATE OF TIRES |
|---|---|---|---|---|
| #01 | A | X1 | 1.0X1 | |
| #02 | B | X1 | 0.5X1 | |
| ... | ... | ... | ... | ... |
| #09 | A | X1 | 0.8X1 | FAILURE |
[Fig. 10]
[Fig. 11]
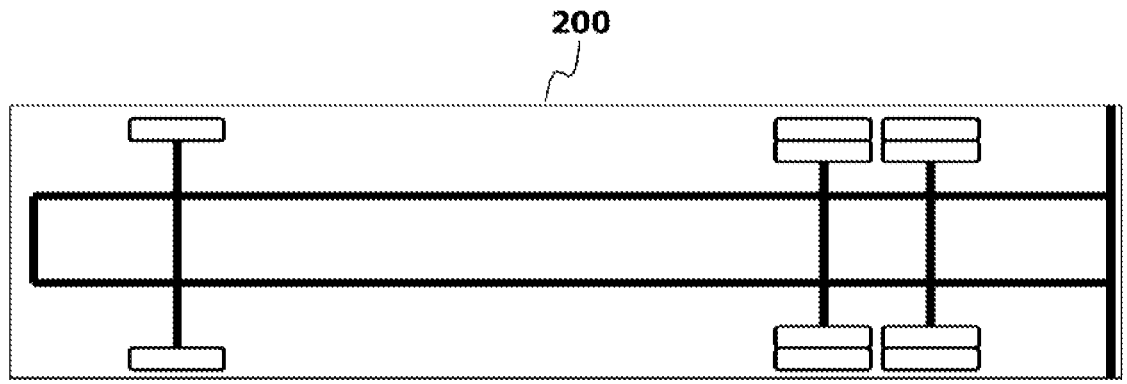

[Fig. 12]
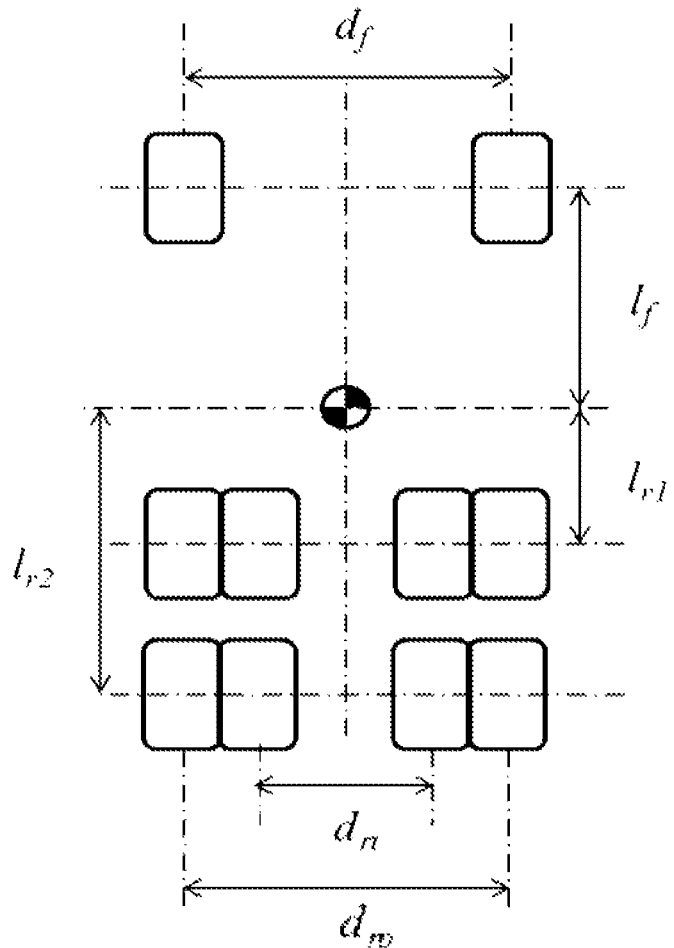
[Fig. 13]
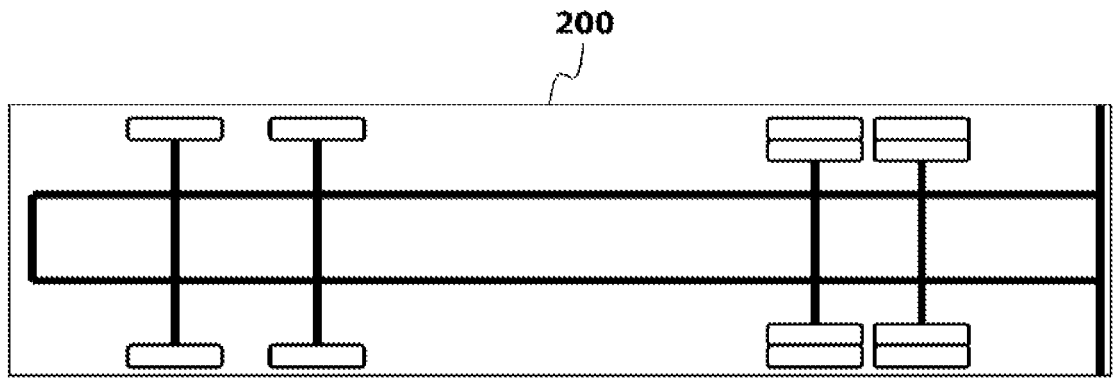

[Fig. 14]
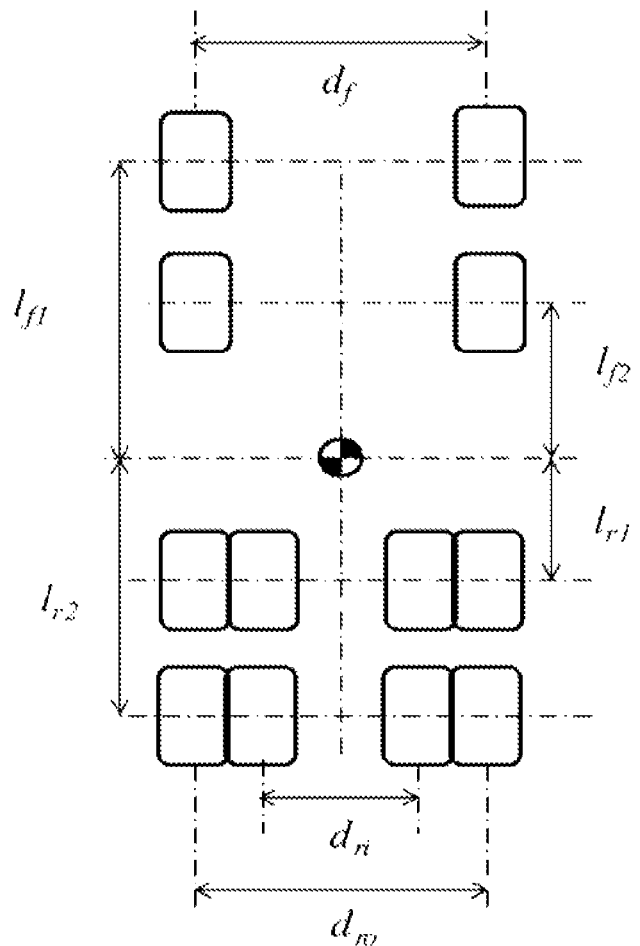
[Fig. 15]
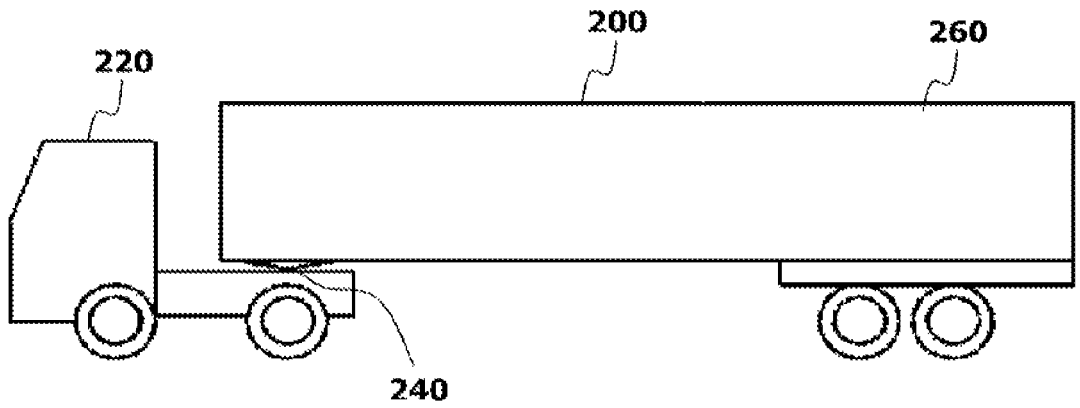

[Fig. 16]
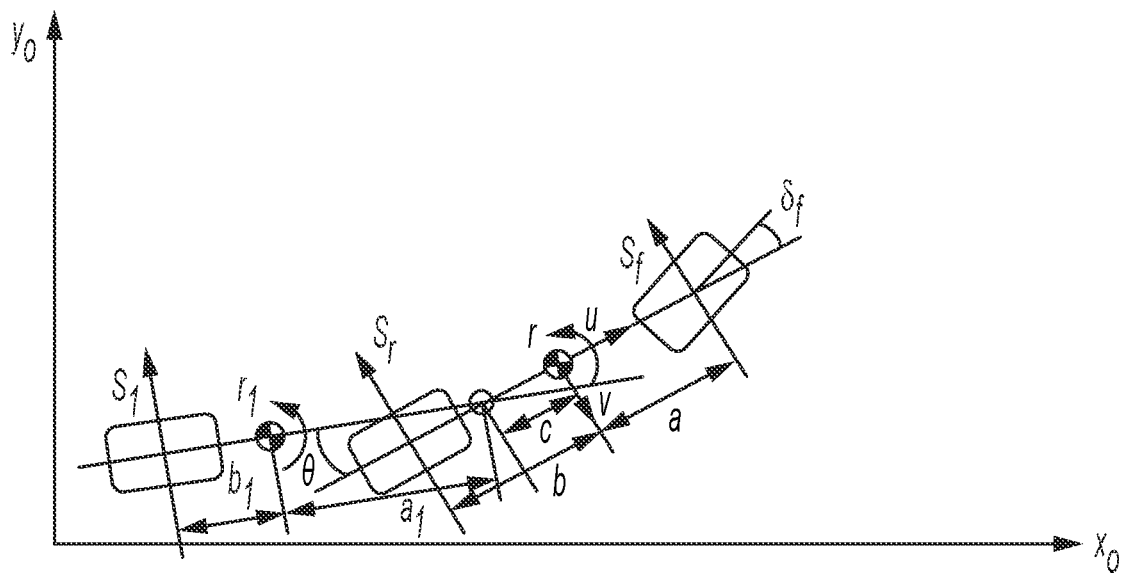
[Fig. 17]
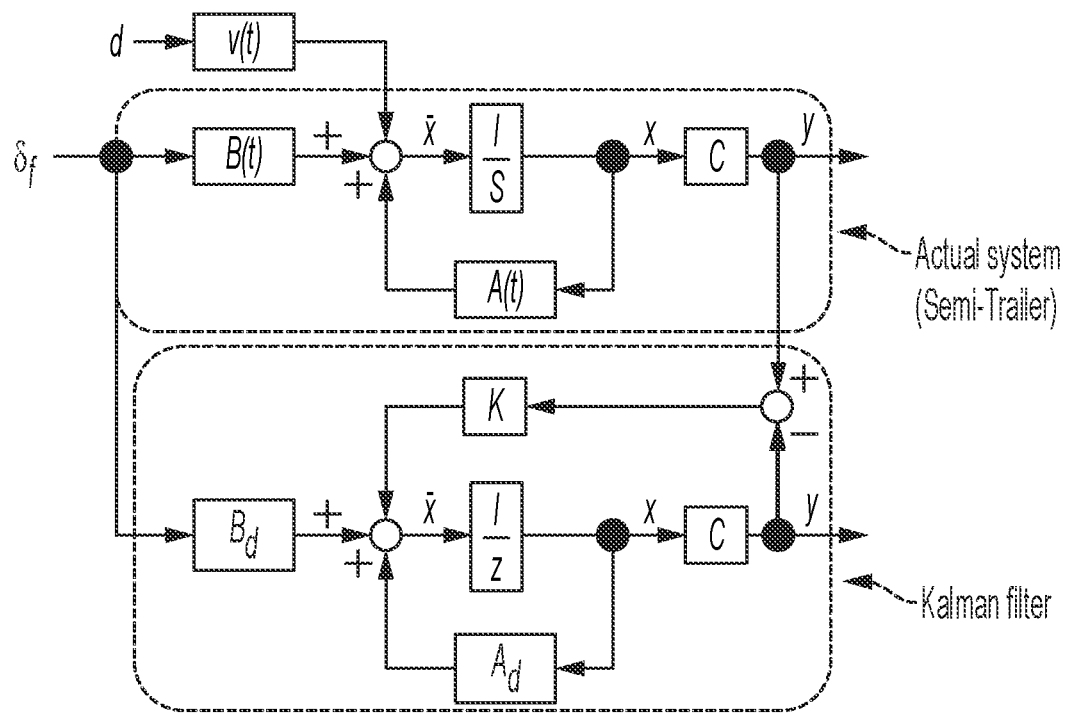

[Fig. 18]
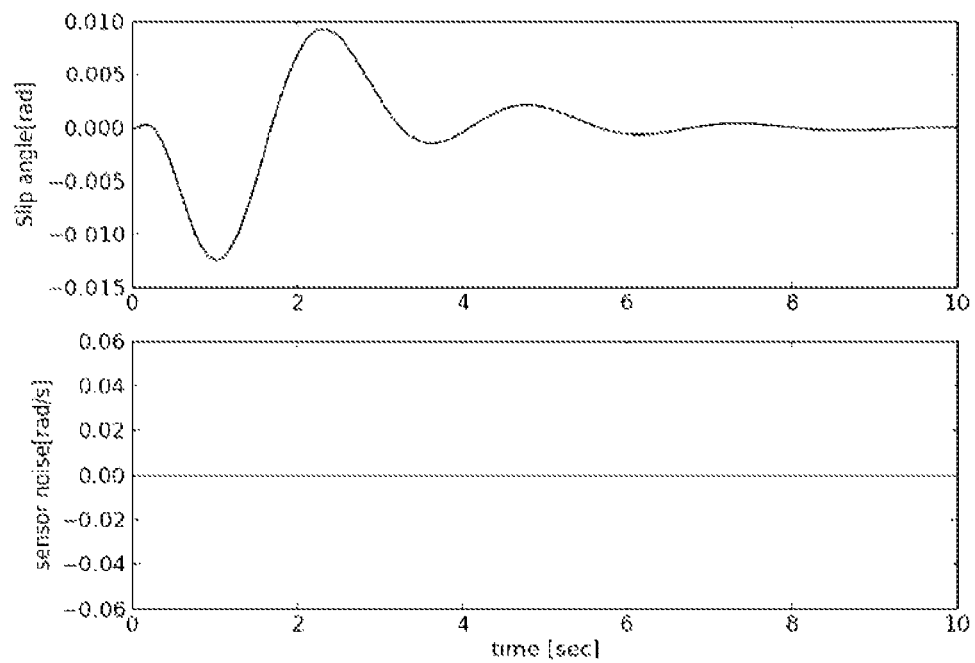
[Fig. 19]
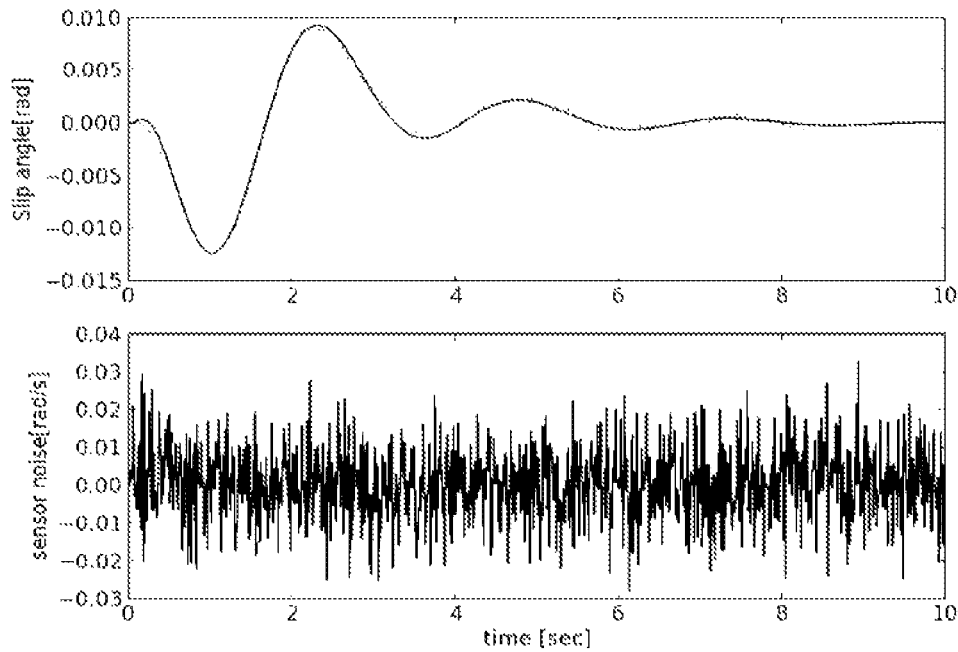

[Fig. 20]
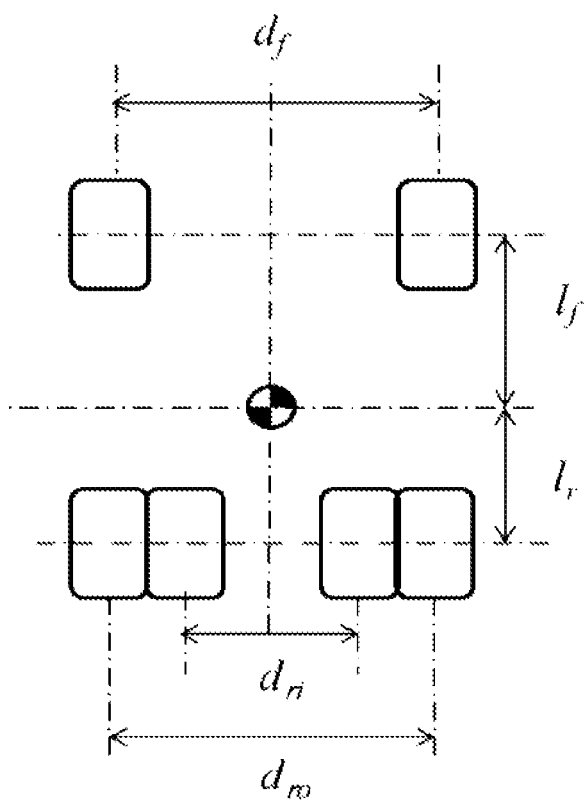

DEVICE, METHOD, AND PROGRAM FOR TIRE FAILURE DETECTION, AND COMPUTER-READABLE RECORDING MEDIUM RECORDING TIRE FAILURE DETECTION PROGRAM

CROSS-REFERENCE TO RELATED APPLICATIONS

This application is a U.S. National Stage application of PCT/JP2018/008059, filed Mar. 2, 2018, and published on Sep. 6, 2019, as WO 2019/167264 A1, all of which is hereby incorporated by reference in its entirety.

TECHNICAL FIELD

The present invention relates to a tire failure detection device, a tire failure detection method, a tire failure detection program, and a computer-readable recording medium recording a tire failure detection program.

BACKGROUND ART

Conventionally, techniques for detecting a tire failure such as tire wear have been proposed. Such techniques include a technique for detecting tire wear based on the output signal of an acceleration sensor mounted directly on each tire, as disclosed in WO 2006/001255 A1.

CITATION LIST

Patent Literature

PTL1:WO 2006/001255 A1

SUMMARY OF INVENTION

Technical Problem

Being attached directly to each tire, the acceleration sensor is affected by, for example, the centrifugal force of the rotating tire and/or the impact force from rough road surfaces on which the vehicle travels. Therefore, the above conventional technique is not sufficiently reliable in terms of durability over long periods of use since, for example, the acceleration sensor is susceptible to failure.

In view of the above circumstances, the present invention has been made to provide a tire failure detection device, a tire failure detection method, a tire failure detection program, and a computer-readable recording medium recording a tire failure detection program, each of which is for detecting a tire failure using an output signal of a sensor installed in a vehicle, thus being sufficiently reliable in terms of durability over long periods of use.

Solution to Problem

The tire failure detection device comprises a steering angle sensor for sensing a steering angle, a yaw rate sensor for sensing a yaw rate, and a control unit. The control unit calculates side-slip energy based on the output signal of the steering angle sensor and the output signal of the yaw rate sensor, and determines that a failure has occurred in a tire when the side-slip energy exceeds a first threshold.

Advantageous Effects of Invention

The present invention achieves its object without using a sensor mounted directly on a tire, thus being sufficiently reliable in terms of durability over long periods of use.

BRIEF DESCRIPTION OF DRAWINGS

FIG. 1 is a system configuration diagram of an exemplary telematics system.
FIG. 2 is an internal configuration diagram of an exemplary on-board unit.
FIG. 3 is an internal configuration diagram of an exemplary control unit.
FIG. 4 is an internal configuration diagram of an exemplary server computer.
FIG. 5 is a flowchart of exemplary tire failure detection processing.
FIG. 6 is an illustration of an exemplary vehicle physical model.
FIG. 7 is a graph showing the relationship between the side-slip energy and tire damage degree.
FIG. 8 is flowchart of exemplary database updating processing.
FIG. 9 is an illustration of exemplary records stored in a database.
FIG. 10 is an illustration of an exemplary display form of the tire damage degree.
FIG. 11 is a plan view of an exemplary vehicle according to Variation 1.
FIG. 12 is an illustration of an exemplary vehicle physical model according to Variation 1.
FIG. 13 is a plan view of an exemplary vehicle according to Variation 2.
FIG. 14 is an illustration of an exemplary vehicle physical model according to Variation 2.
FIG. 15 is a side view of an exemplary vehicle according to Variation 3.
FIG. 16 is an illustration of an exemplary analysis model according to Variation 3.
FIG. 17 is an illustration of an example of the Kalman filter.
FIG. 18 is an illustration of an exemplary time-series response of an estimated side-slip angle with no noise superimposed.
FIG. 19 is an illustration of an exemplary time-series response of an estimated side-slip angle with noise superimposed.
FIG. 20 is an illustration of an exemplary physical model for a tractor.

DESCRIPTION OF EMBODIMENTS

An embodiment for implementing the present invention will be described below with reference to the accompanying drawings. FIG. 1 shows an exemplary telematics system incorporating therein a tire failure detection device.

A telematics system 100 includes an on-board unit 300, a server computer 400, and a personal computer 500. The on-board unit 300 is installed in a vehicle 200 such as a truck. The server computer 400 is installed in a management center MC of an application provider. The personal computer 500 is installed in a back office BO of a transportation company or the like. The vehicle 200 is not limited to a truck, and may be a vehicle such as a bus, a car, a tractor, or a construction machine.

As shown in FIG. 2, the on-board unit 300 includes a telematics unit 320 for using a telematics service, a control unit 340 for implementing a tire failure detection device, a global positioning system (GPS) antenna 360 for receiving a GPS signal from a GPS satellite 600, and a radio unit 380 for radio communications with the server computer 400 of the management center MC. The telematics unit 320 is connected to the control unit 340, GPS antenna 360, and radio unit 380 so as to be interactively communicable with each other. The on-board unit 300 may include a human machine interface (HMI) for providing an input-output function of the telematics unit 320.

As shown in FIG. 3, the control unit 340 includes therein a processor 340A such as a central processing unit (CPU), a non-volatile memory 340B, a volatile memory 340C, an input-output circuit 340D, a communication circuit 340E, and a bus 340F for connecting these components with each other. The non-volatile memory 340B is formed, for example, of a flash read only memory (ROM), which is capable of retaining data even when power is shut off, and stores therein a control program (tire failure detection program) for implementing the tire failure detection device, and the like. The volatile memory 340C is formed, for example, of a dynamic random access memory (RAM), which loses its data when power is shut off, and serves as a temporary storage area for the processor 340A. The input-output circuit 340D receives various digital or analog signals from sensors, switches, and the like, and outputs digital or analog driving signals to external devices such as an actuator. The communication circuit 340E provides an interface for connecting to an on-board network such as a controller area network (CAN).

Via the input-output circuit 340D, the control unit 340 receives an output signal of a steering angle sensor 700 for sensing a steering angle δ of the vehicle 200, an output signal of a yaw rate sensor 720 for sensing a yaw rate r of the vehicle 200, and an output signal of a vehicle speed sensor 740 for sensing a vehicle speed V of the vehicle 200. Via the communication circuit 340E, the control unit 340 is connected to an engine control unit 760 for electronically controlling an engine (not shown) so as to be interactively communicable with each other.

As shown in FIG. 4, the server computer 400 of the management center MC includes therein a processor 400A such as a CPU, a non-volatile memory 400B, a volatile memory 400C which serves as a temporary storage area for the processor 400A, an input-output circuit 400D for connecting to external devices, a storage 400E such as a hard disk drive, and a bus 400F connecting these components with each other.

Via, for example, the Internet 800, which is an example of a computer network, the personal computer 500 of the back office BO is connected to the server computer 400 of the management center MC so as to be interactively communicable with each other, thus using services provided by the application provider. A web browser, for example, is pre-installed on the personal computer 500 such that various settings are available for the services provided by the application provider.

In the telematics system 100 as described above, when the ignition switch of the vehicle 200 is turned from off to on, the telematics unit 320 of the on-board unit 300 establishes radio communication with the server computer 400 of the management center MC, in response. Thereby, telematics services provided by the server computer 400 of the management center MC becomes available to the telematics unit 320.

In addition, when the ignition switch of the vehicle 200 is turned from off to on, the processor 340A of the control unit 340 in the on-board unit 300 executes the control program stored in the non-volatile memory 340B, in response. Thereby, the processor 340A of the control unit 340 calculates side-slip energy E based on the output signals from the steering angle sensor 700, yaw rate sensor 720, and vehicle speed sensor 740. When the side-slip energy E exceeds a first threshold, the processor 340A of the control unit 340 determines that a tire failure has occurred.

In place of receiving the output signals from the steering angle sensor 700, yaw rate sensor 720, and vehicle speed sensor 740, the processor 340A of the control unit 340 may retrieve the steering angle δ, yaw rate r, and vehicle speed V from one or more different control units connected to the control unit 340 so as to be interactively communicable with each other via the on-board network. As yet another alternative, in place of the output signal of the vehicle speed sensor 740, the processor 340A of the control unit 340 may use a predetermined constant such as the speed limit for a road along which the vehicle 200 has frequently traveled.

FIG. 5 shows exemplary tire failure detection processing repeatedly performed by the processor 340A of the control unit 340 at predetermined time intervals in response to the start-up of the control unit 340.

The tire failure detection processing may be implemented by causing a computer, such as the processor 340A of the control unit 340, to execute the tire failure detection program that defines the processing described in this embodiment. The tire failure detection program may be recorded in a computer-readable recording medium, such as portable memory, for storage, delivery, and the like. As an alternative, the tire failure detection program may be delivered via the Internet, by e-mail, or the like, to a computer that is expected to perform the tire failure detection processing.

In step 1 (abbreviated as "S1" in FIG. 5; the same applies below), the processor 340A of the control unit 340 retrieves the yaw rate r from the yaw rate sensor 720.

In step 2, the processor 340A of the control unit 340 determines whether or not the absolute value of the yaw rate r is above a predetermined angular velocity. Here, as will be described later, when the side-slip energy E is estimated by integrating the side-slip angle β, the estimation accuracy is reduced by accumulation of errors. The predetermined angular velocity is a threshold for limiting such a decrease in estimation accuracy, and may be determined in consideration, for example, of the resolution of the yaw rate sensor 720. When the processor 340A of the control unit 340 determines that the absolute value of yaw rate r is above the predetermined angular velocity (Yes), the operation proceeds to step 3. On the other hand, when determining that the absolute value of yaw rate r is equal to or below the predetermined angular velocity (No), the processor 340A of the control unit 340 terminates the tire failure detection processing in the control cycle in order to limit a decrease in estimation accuracy.

In step 3, the processor 340A of the control unit 340 retrieves the steering angle δ from the steering angle sensor 700.

In step 4, the processor 340A of the control unit 340 retrieves the vehicle speed V from the vehicle speed sensor 740.

In step 5, the processor 340A of the control unit 340 estimates the side-slip angle β of the vehicle 200 based on the steering angle δ, yaw rate r, and vehicle speed V. Specifically, as expressed by the following equation, the processor 340A of the control unit 340 estimates the side-slip angle β by subtracting the value obtained by applying a first-order low-pass filter $h_2/(T_1s+1)$ to the yaw rate r (the product of the yaw rate r and first-order low-pass filter $h_2/(T_1s+1)$) from the value obtained by applying a first-order low-pass filter $h_1/(T_1s+1)$ to the steering angle δ (the product of the steering angle δ and first-order low-pass filter $h_1/(T_1s+1)$). The first-order low-pass filters $h_1/(T_1s+1)$ and $h_2/(T_1s+1)$ are examples of first and second low-pass filters, respectively.

$$\beta(s) = \frac{h_1}{T_1s+1}\delta(s) - \frac{h_2}{T_1s+1}r(s) \qquad [\text{Math.1}]$$

In the above equation for estimating the side-slip angle β, s is the Laplace operator, $T_1$ is the time constant for the low-pass filter, and $h_1$ and $h_2$ are filter gains. Here, the time constant $T_1$ for the low-pass filter, and the filter gains $h_1$ and $h_2$ may be determined by using a vehicle physical model (equivalent two-wheel model) as shown in FIG. 6. Assume here that the vehicle weight is m, the front tire cornering power is $K_f$, the rear tire cornering power is $K_r$, the distance between the front axle and gravitational center is $l_f$, and the distance between the rear axle and gravitational center is $l_r$. Then, in the vehicle physical model, the relationships between these quantities and the vehicle speed V are given by the following expressions, to be specific. Thus, the time constant $T_1$ for the low-pass filter, and the filter gains $h_1$ and $h_2$ can be calculated using these relational expressions. As the vehicle weight m, the total vehicle weight or the vehicle weight with an average payload may be used, for example. The time constant $T_1$ for the low-pass filter, and the filter gains $h_1$ and $h_2$ may be stored as updatable values in the non-volatile memory 340B of the control unit 340 so as to be easily adapted to different vehicles 200.

$$\begin{aligned}
h_1 &= b0/a12 \\
h_2 &= a13/a12 \\
T_1 &= a11/a12 \\
a11 &= mV \\
a12 &= 2(K_f + K_r) \\
a13 &= mV + \frac{2(l_f K_f - l_r K_r)}{V} \\
b0 &= 2K_f
\end{aligned} \qquad [\text{Math. 2}]$$

In step 6, the processor 340A of the control unit 340 determines whether or not the absolute value of the side-slip angle β is greater than a predetermined angle. Here, as will be described later, the accuracy in calculating the side-slip energy E is reduced by accumulation of errors. The predetermined angle is a threshold for limiting such a decrease in calculation accuracy, and may be determined in consideration, for example, of calculation errors. When the processor 340A of the control unit 340 determines that the absolute value of the side-slip angle β is greater than the predetermined angle (Yes), the operation proceeds to step 7. On the other hand, when determining that the absolute value of the side-slip angle β is equal to or less than the predetermined angle (No), the processor 340A of the control unit 340 terminates the tire failure detection processing in the control cycle in order to limit a decrease in calculation accuracy.

In step 7, the processor 340A of the control unit 340 calculates the side-slip energy E by integrating the side-slip angle β as expressed by the following equation:

$$E = \int mV\beta dt \qquad [\text{Math.3}]$$

The vehicle weight m in the above equation for calculating the side-slip energy E may be obtained as follows. Note, however, that the following techniques are merely examples, and the vehicle weight m may be obtained using other known techniques. As yet another alternative, the total vehicle weight, the vehicle weight with an average payload, or the like may be used as the vehicle weight m.

(1) When the vehicle 200 includes an air suspension system, the vehicle weight m may be estimated based on the air pressure acting on the air suspension system.

(2) When the vehicle 200 is provided with an input device for allowing the driver to select one from among different payload values, the sum of the selected payload value and the empty vehicle weight may be used as the vehicle weight m.

(3) When the vehicle 200 includes a leaf suspension system, the load acting on the leaf spring may be detected using a piezoelectric element, and the vehicle weight m may be estimated based on the detected load.

(4) When the vehicle 200 is provided with a load cell for measuring its payload, the sum of the payload value measured by the load cell and the empty vehicle weight may be used as the vehicle weight m.

In step 8, the processor 340A of the control unit 340 determines whether or not the side-slip energy E is above the first threshold. Here, the first threshold is defined for determining whether or not a tire failure has occurred. The initial value for the first threshold may be appropriately defined in consideration, for example, of the wear characteristics of the tires. When determining that the side-slip energy E is above the first threshold (Yes), the processor 340A of the control unit 340 decides that a tire failure (such as tire wear) has occurred, and the operation proceeds to step 9. On the other hand, when determining that the side-slip energy E is equal to or below the first threshold (No), the processor 340A of the control unit 340 decides that no tire failure has occurred, and the operation proceeds to step 11.

In step 9, the processor 340A of the control unit 340 displays the occurrence of the tire failure on, for example, the HMI display of the on-board unit 300.

In step 10, the processor 340A of the control unit 340 uses the telematics unit 320 to communicate the occurrence of the tire failure to the server computer 400 of the management center MC. The data transmitted to the server computer 400 in this communication may include an identifier that allows identification of the vehicle 200, the side-slip energy E generated when the processor 340A of the control unit 340 decides that the tire failure has occurred, and the like, in addition to information indicating the occurrence of the tire failure.

In step 11, the processor 340A of the control unit 340 determines whether or not the side-slip energy E is above a second threshold, which is greater than the first threshold. Here, the second threshold is defined for preventing the driver of the vehicle 200 from continuing to drive even after having recognized the occurrence of a tire failure, and may be appropriately defined in consideration, for example, of the characteristics of the tires. When determining that the side-slip energy E is above the second threshold (Yes), the processor 340A of the control unit 340 decides that there is a risk of a tire blowout, and the operation proceeds to step 12. On the other hand, when determining that the side-slip energy E is equal to or below the second threshold (No), the processor 340A of the control unit 340 decides that there is no risk of a tire blowout, and terminates the tire failure detection processing in the control cycle.

In step 12, the processor 340A of the control unit 340 outputs an output power reduction command to the engine control unit 760 via the communication circuit 340E. Upon receiving the output power reduction command, the engine control unit 760 lowers the engine power output by, for example, reducing the fuel injection amount, and/or retarding the ignition timing.

According to the tire failure detection device as described above, when the absolute value of yaw rate r of the vehicle 200 is above the predetermined angular velocity, the control unit 340 estimates the side-slip angle β of the vehicle 200 depending on the steering angle δ, yaw rate r and vehicle speed V using the simple estimating equation representing the vehicle physical model. Furthermore, when the absolute value of the side-slip angle β is above the predetermined angle, the control unit 340 calculates the side-slip energy E of the vehicle 200 by integrating the side-slip angle β.

The side-slip energy E of the vehicle 200, which indicates a friction energy generated by tire side-slip, may be used as a warning sign of tire failure. In light of this, in this embodiment, an appropriate value is set as the first threshold in consideration, for example, of the tire friction characteristics, and the control unit 340 decides that a tire failure, such as tire wear, has occurred when the side-slip energy E exceeds the first threshold. Furthermore, when deciding that a tire failure has occurred, the control unit 340 uses the functions of the telematics unit 320 to communicate the occurrence of the tire failure to the server computer 400 of the management center MC. When deciding that a tire failure has occurred, the control unit 340 also informs the driver of the occurrence of the tire failure by using, for example, the HMI for the telematics unit 320.

Thus, when installed in a vehicle including a stability control system such as an anti-skid system, the control unit 340 can detect whether or not a tire failure, such as tire wear, has occurred by using the output signals from the existing steering angle sensor, yaw rate sensor, and vehicle speed sensor. These sensors used for this tire failure detection are not mounted directly on the tires. Thus, the sensors are not affected by the centrifugal force of the rotating tires or the impact force from the rough road surfaces on which the vehicle travels, and can last over long periods of use.

Furthermore, the control unit 340 also deals with a situation in which the driver of the vehicle 200 recognizes the occurrence of a tire failure but ignores it and continues to drive. Specifically, when the side-slip energy E exceeds the second threshold, which is greater than the first threshold, the output power reduction command is transmitted to the engine control unit 760, and the engine power output of the vehicle 200 is reduced in response. This reduces the driving force acting on the tires, thus lowering, for example, the risk of a tire blowout. In addition, the driver of the vehicle 200 is allowed only slow acceleration at that time, for example. Thus, it is expected that the driver of the vehicle 200 may feel uncomfortable continuing to drive with such a reduced engine power output, and have tire maintenance performed before a tire blowout actually occurs.

This will be further described with reference to FIG. 7, in which the abscissa represents the side-slip energy and the ordinate represents the tire damage degree. When the side-slip energy exceeds a threshold A, the tire damage degree exceeds 80% and requires tire replacement. When the side-slip energy exceeds a threshold B, which is greater than the threshold A, a tire blowout could occur at any time. In this case, the engine power output is reduced as described above, and the risk of a tire blowout can be reduced by some amount.

FIG. 8 shows exemplary database updating processing that the server computer 400 of the management center MC performs by following the control program stored in the storage 400E in response to a tire failure notice from the vehicle 200. Here, in the storage 400E of the server computer 400, a database as shown in FIG. 9 is created. Specifically, the database stores therein records each associated with the identifier that allows vehicle identification, the tire type, the threshold (first threshold) for use in failure determination, the estimated value of side-slip energy, and the state of tires. The initial estimated value of side-slip energy E may be set, for example, to zero, which indicates that the tires are new and unused.

In step 21, the processor 400A of the server computer 400 refers to the database created in the storage 400E, and identifies a record associated with the identifier included in the data transmitted from the vehicle 200.

In step 22, the processor 400A of the server computer 400 updates the estimated value of side-slip energy in the record identified in step 21 with the side-slip energy E included in the data transmitted from the vehicle 200. In addition, the processor 400A of the server computer 400 updates the state of the tires in the record identified in step 21 with "failure".

In the database updating processing as described above, the processor 400A of the server computer 400 updates the estimated value of side-slip energy as well as the state of tires of the vehicle 200 in response to a tire failure notice from the vehicle 200. This allows the manager, such as in a transportation company, working in the back office BO to know, for example, the state of tires of each vehicle managed by the company at any time by operating the personal computer 500 and logging into the server computer 400 of the management center MC.

Then, when the state of tires of any one of the vehicles 200 is "failure", the manager such as in a transportation company may determine that this vehicle 200 requires tire maintenance, and use the telematics service to call the vehicle 200 back to a dealer or the like. The manager such as in a transportation company may update the first threshold for failure determination, based on the actual tire wear state which is measured with a digital tire wear gauge or the like during the tire maintenance and the side-slip energy generated when the tire failure has occurred. At that time, the manager such as in a transportation company requests the management center MC to update the database.

Upon receiving the database update request, the management center MC updates the database in the server computer 400 and uses the telematics service to transmit a threshold update request to the vehicle 200. Upon receiving the threshold update request, the vehicle 200 updates the first threshold for use in the tire failure determination processing. The first threshold may be stored in the non-volatile memory 340B so as to be updatable at any time.

The side-slip energy E of the vehicle 200 may also be utilized as follows. When the vehicle 200 transmits the side-slip energy E at predetermined time intervals, the server computer 400 of the management center MC sequentially stores, in the database, time series values of the side-slip energy E of the vehicle 200. The manager such as in a transportation company refers to the database in the server computer 400, and can identify any of the vehicles 200 of which the side-slip energy E is in an increasing trend. In addition, the manager such as in a transportation company can provide the driver of the vehicle 200 with instructions to drive in a manner that will minimize stress on the tires. This encourages the driver of the vehicle 200 to drive with a smaller side-slip energy E, and will improve the fuel economy of the vehicle 200 as well.

When a vehicle experiences a tire failure even when the side-slip energy E is below the first threshold after tire maintenance performed by a dealer or the like, this may be considered to be a worst case. The manager such as in a transportation company may compare this worst case data and the estimated value of side-slip energy E of each vehicle 200, and call any vehicle 200 having the side-slip energy E that is close to the worst case data back to a dealer or the like to have tire maintenance performed. When a tire happens to experience a failure while driving with a smaller side-slip energy E, the tire is likely to be somehow defective and may be a recalled tire. Thus, the manager such as in a transportation company may check this by referring to the database. In response, the manufacturer of the tire uses data provided by the transportation company and/or the like to examine whether the tire is being recalled, and takes appropriate measures as necessary.

In the above embodiment, the tire failure detection device is implemented by the control unit 340. Alternatively, however, the tire failure detection device may be implemented using the telematics unit 320. In this case, the telematics unit 320 may retrieve at least the steering angle δ and yaw rate r via the on-board network.

As yet another alternative, the control unit 340 may refer to the graph showing the relationship between the side-slip energy and tire damage degree as shown in FIG. 7, and display, on the HMI for the telematics unit 320, the tire damage degree calculated based on the side-slip energy E in a form such as a bar graph shown in FIG. 10. This allows the driver of the vehicle 200 to check the tire damage degree at any time.

There is a greater variety of axle layouts for trucks than, for example, cars. Thus, when the vehicle 200 is a truck, the side-slip angle β and side-slip energy E of the vehicle 200 may not be accurately calculated by the above method. Thus, when the vehicle 200 is a truck, the side-slip energy E of the vehicle 200 may be calculated by allocating the side-slip angle β of the gravitational center of the vehicle body to the tires in accordance with the axle layout of the truck as described in the following Variations.

<Variation 1>

When the vehicle 200 is a truck with one front axle, and two rear axles each fitted with double tires, as shown in FIG. 11, the physical model for the vehicle 200 may be shown in FIG. 12. In this vehicle physical model, assume that the front tire tread is $d_f$, the outer rear tire tread is $d_{ro}$, the inner rear tire tread is $d_{ri}$, the distance between the front axle and gravitational center is $l_f$, the distance between the more forward of the rear axles and gravitational center is $l_{r1}$, and the distance between the more rearward of the rear axles and gravitational center is $l_{r2}$. Then, the side-slip angle $\beta_{f1}$ of the left front tire and the side-slip angle $\beta_{f2}$ of the right front tire may be calculated by the following formulas:

$$\beta_{f1} \approx \frac{V\beta + l_f r}{V - \frac{d_f r}{2}} \quad [\text{Math 4}]$$

$$\beta_{f2} \approx \frac{V\beta + l_f r}{V + \frac{d_f r}{2}}$$

The side-slip angle $\beta_{r11}$ of the more forward of the outer left rear tires, the side-slip angle $\beta_{r12}$ of the more forward of the inner left rear tires, the side-slip angle $\beta_{r13}$ of the more forward of the inner right rear tires, and the side-slip angle $\beta_{r14}$ of the more forward of the outer right rear tires may be calculated by the following formulas:

$$\beta_{r11} \approx \frac{V\beta - l_{r1} r}{V - \frac{d_{ro} r}{2}} \quad [\text{Math 5}]$$

$$\beta_{r12} \approx \frac{V\beta - l_{r1} r}{V - \frac{d_{ri} r}{2}}$$

$$\beta_{r13} \approx \frac{V\beta - l_{r1} r}{V + \frac{d_{ri} r}{2}}$$

$$\beta_{r14} \approx \frac{V\beta - l_{r1} r}{V + \frac{d_{ro} r}{2}}$$

The side-slip angle $\beta_{r21}$ of the more rearward of the outer left rear tires, the side-slip angle $\beta_{r22}$ of the more rearward of the inner left rear tires, the side-slip angle $\beta_{r23}$ of the more rearward of the inner right rear tires, and the side-slip angle $\beta_{r24}$ of the more rearward of the outer right rear tires may be calculated by the following formulas:

$$\beta_{r21} \approx \frac{V\beta - l_{r2} r}{V - \frac{d_{ro} r}{2}} \quad [\text{Math 6}]$$

$$\beta_{r22} \approx \frac{V\beta - l_{r2} r}{V - \frac{d_{ri} r}{2}}$$

$$\beta_{r23} \approx \frac{V\beta - l_{r2} r}{V + \frac{d_{ri} r}{2}}$$

$$\beta_{r24} \approx \frac{V\beta - l_{r2} r}{V + \frac{d_{ro} r}{2}}$$

When the vehicle 200 is a vehicle as described above, the side-slip energy E may be calculated by the following equation using the side-slip angle of each tire and be used as a warning sign of failure of the tire.

$$E_{ijk} = \int \frac{m}{10} V \beta_{ijk} dt \quad [\text{Math 7}]$$

<Variation 2>

When the vehicle 200 is a truck with two front axles, and two rear axles each fitted with double tires, as shown in FIG. 13, the physical model for the vehicle 200 may be shown in FIG. 14. In this vehicle physical model, assume that the front tire tread is $d_f$, the outer rear tire tread is $d_{ro}$, the inner rear tire tread is $d_{ri}$, the distance between the more forward of the front axles and gravitational center is $l_{f1}$, the distance between the more rearward of the front axles and gravitational center is $l_{f2}$, the distance between the more forward of the rear axles and gravitational center is $l_{r1}$, and the distance between the more rearward of the rear axles and gravitational center is $l_{r2}$. Then, the side-slip angle $\beta_{f11}$ of the more forward of the left front tires, the side-slip angle $\beta_{f12}$ of the more forward of the right front tires, the side-slip angle $\beta_{f21}$ of the more rearward of the left front tires, and the side-slip angle $\beta_{f22}$ of the more rearward of the right front tires may be calculated by the following formulas:

$$\beta_{f11} \approx \frac{V\beta + l_{f1}r}{V - \frac{d_f r}{2}} \qquad [\text{Math. 8}]$$

$$\beta_{f12} \approx \frac{V\beta + l_{f1}r}{V + \frac{d_f r}{2}}$$

$$\beta_{f21} \approx \frac{V\beta + l_{f2}r}{V - \frac{d_f r}{2}}$$

$$\beta_{f22} \approx \frac{V\beta + l_{f2}r}{V + \frac{d_f r}{2}}$$

The side-slip angle $\beta_{r11}$ of the more forward of the outer left rear tires, the side-slip angle $\beta_{r12}$ of the more forward of the inner left rear tires, the side-slip angle $\beta_{r13}$ of the more forward of the inner right rear tires, and the side-slip angle $\beta_{r14}$ of the more forward of the outer right rear tires may be calculated by the following formulas:

$$\beta_{r11} \approx \frac{V\beta - l_{r1}r}{V - \frac{d_{ro} r}{2}} \qquad [\text{Math. 9}]$$

$$\beta_{r12} \approx \frac{V\beta - l_{r1}r}{V - \frac{d_{ri} r}{2}}$$

$$\beta_{r13} \approx \frac{V\beta - l_{r1}r}{V + \frac{d_{ri} r}{2}}$$

$$\beta_{r14} \approx \frac{V\beta - l_{r1}r}{V + \frac{d_{ro} r}{2}}$$

The side-slip angle $\beta_{r21}$ of the more rearward of the outer left rear tires, the side-slip angle $\beta_{r22}$ of the more rearward of the inner left rear tires, the side-slip angle $\beta_{r23}$ of the more rearward of the inner right rear tires, and the side-slip angle $\beta_{r24}$ of the more rearward of the outer right rear tires may be calculated by the following formulas:

$$\beta_{r21} \approx \frac{V\beta - l_{r2}r}{V - \frac{d_{ro} r}{2}} \qquad [\text{Math. 10}]$$

$$\beta_{r22} \approx \frac{V\beta - l_{r2}r}{V - \frac{d_{ri} r}{2}}$$

$$\beta_{r23} \approx \frac{V\beta - l_{r2}r}{V + \frac{d_{ri} r}{2}}$$

$$\beta_{r24} \approx \frac{V\beta - l_{r2}r}{V + \frac{d_{ro} r}{2}}$$

When the vehicle 200 is a vehicle as described above, the side-slip energy E may be calculated by the following equation using the side-slip angle of each tire, and used as a warning sign of failure of the tire.

$$E_{ijk} = \int \frac{m}{12} V \beta_{ijk} dt \qquad [\text{Math. 11}]$$

<Variation 3>

When the vehicle 200 is a semi-trailer truck including a trailer 260, and a tractor 220 with one front axle and one rear axle fitted with double tires as shown in FIG. 15, the tractor 220 tows the trailer 260 which is coupled to the tractor 220 via a fifth wheel (coupler) 240, and is affected by the trailer 260. In light of this, an analysis model for a semi-trailer truck may be defined as shown in FIG. 16 which differs from that for trucks each including no towed trailer 260. The side-slip angle of the tractor 220 may be calculated by applying the discrete-time Kalman filter as shown in FIG. 17 to this analysis model.

In this analysis model for a semi-trailer truck, assume that the distance between the front axle and gravitational center of the tractor 220 is a, the distance between the fifth wheel 240 and gravitational center of the trailer 260 is $a_1$, the distance between the rear axle and gravitational center of the tractor 220 is b, the distance between the rear axle and gravitational center of the trailer 260 is $b_1$, the distance between the fifth wheel 240 and gravitational center of the tractor 220 is c, the wheelbase of the tractor 220 is 1, the wheelbase of the trailer 260 is $1_1$, the mass of the tractor 220 is m, the mass of the trailer 260 is $m_1$, the front tire cornering power of the tractor 220 is $C_f$, the rear tire cornering power of the tractor 220 is $C_r$, the cornering power of the trailer 260 is $C_1$, the yaw moment of inertia of the tractor 220 is I, the yaw moment of inertia of the trailer 260 is $I_1$, the lateral velocity of the gravitational center of the tractor 220 is v, the steering angle of the tractor 220 is $\delta$, the yaw angle of the trailer 260 is $r_1$, the angular velocity of the fifth wheel 240 is $\omega$, the angle of the fifth wheel 240 is $\theta$, and the vehicle speed is u. Then, the equation of state representing the motion of the semi-trailer truck may be expressed as follows:

$$x = [v \ r \ \overline{\omega} \ \theta]^T \qquad [\text{Math. 12}]$$

$$y = Cx$$

$$A = M^{-1} A_0$$

$$B = M^{-1}B_0$$

$$M^{-1} = \begin{bmatrix} m+m_1 & -m_1(a_1+c) & m_1a_1 & 0 \\ mc & I_Z & 0 & 0 \\ m_1a_1 & -I_1-m_1a_1(a_1+c) & I_1+m_1a_1^2 & 0 \\ 0 & 0 & 0 & 1 \end{bmatrix}^{-1}$$

$$A_0 =$$

$$\begin{bmatrix} -\dfrac{C_f+C_r+C_1}{u} & -(m+m_1)u - \dfrac{a(a+c)C_r - bC_r - (c+l_1)C_1}{u} & -\dfrac{l_1C_1}{u} & -C_1 \\ \dfrac{-C_f(a+c)+C_r(c-b)}{u} & -mcu - \dfrac{a(a+c)C_f - b(c-b)C_r}{u} & 0 & 0 \\ \dfrac{C_1l_1}{u} & -m_1a_1u + \dfrac{C_1l_1(l_1+c)}{u} & -\dfrac{C_1l_1^2}{u} & -l_1C_1 \\ 0 & 0 & 1 & 0 \end{bmatrix}$$

$$B_0 = \begin{bmatrix} C_f \\ (a+c)C_f \\ 0 \\ 0 \end{bmatrix}$$

$$\frac{d}{dt}x = Ax + Bu,$$

where x is a state variable, A is a system matrix, B is a control matrix, $M^{-1}$ is an inverse mass matrix, $A_0$ is a damping matrix, and $B_0$ is an external force matrix.

The equation of motion described above is a continuous-time simultaneous differential equation involving linear approximation. Thus, the side-slip angle calculated using the above equation of motion will significantly differ from the actual side-slip angle measured using a side-slip angle sensor. This is because the equation of motion involves linear approximation and no feedback loop is established for the values used in the calculation process. Furthermore, considering that the processor 340A of the control unit 340 calculates the side-slip angle, the equation of motion should be transformed into a discrete-time equation.

Discretizing the system matrix A and control matrix B gives the following difference equation, where T represents a sampling time, and I represents the identity matrix.

$$x(k+1) = A_d x(k) + B_d u(k) \quad \text{[Math. 13]}$$

$$A_d = I + AT + \frac{1}{2!}(FT)^2 + \ldots + \frac{1}{N!}(FT)^N$$

$$E_d = I + \frac{1}{2!}AT + \frac{1}{3!}(FT)^2 + \ldots + \frac{1}{N!}(FT)^{N-1}$$

$$B_d = E_d TB$$

To establish a feedback loop in the above difference equation, the Kalman filter gain K is calculated. The Kalman filter gain K is calculated based on the solution of the following Riccati equation:

$$P = Q + A_d^T P A_d - A_d^T PC(R + C^T PC)^{-1} C^T P A_d$$

$$K = (R + C^T PC)^{-1} C^T P A_d \quad \text{[Math.14]}$$

, where Q represents a disturbance variance matrix, and R represents an observed noise variance matrix.

In the above Riccati equation, P represents an error covariance matrix. Using the feedback gain K thus calculated, the estimated state variable x may be calculated by the following equation:

$$\text{xhat}(k+1) = (A_d - KC)\text{xhat}(k) + Ky(k) + B_d u(k) \quad \text{[Math.15]}$$

Using the estimated state variable x, the side-slip angle β may be calculated by the following equations:

$$x(k) = [x_1 \ x_2 \ x_3 \ x_4]^T = [v \ r \ \omega \ \theta]^T \quad \text{[Math. 16]}$$

$$\beta = \frac{v}{u}$$

FIGS. 18 and 19 each show the time-series response of the estimated side-slip angle when the semi-trailer truck makes a single lane change. In FIGS. 18 and 19, the simulation outcome of the side-slip angle is plotted by a solid line, and the side-slip angle estimated using the Kalman filter is plotted by a dashed line.

FIG. 18 shows the output signal of the yaw rate sensor 720 with no noise superimposed, where each of the following variables takes a nominal (average) value: the mass m of the tractor 220, the yaw moment of inertia I of the tractor 220, the cornering powers $C_f$, $C_r$, $C_1$, the distance a between the front axle and gravitational center of the tractor 220, the distance b between the rear axle and gravitational center of the tractor 220, the distance $a_1$ between the fifth wheel 240 and gravitational center of the trailer 260, the distance $b_1$ between the rear axle and gravitational center of the trailer 260, and the mass $m_1$ of the trailer 260, the yaw moment of inertia $I_1$ of the trailer 260. In FIG. 18, the solid line matches the dashed line. Thus, it can be understood that the side-slip angle was satisfactorily estimated.

FIG. 19 shows estimated values of the output signal of the yaw rate sensor 720 with noise superimposed, where the mass $m_1$ and yaw moment of inertia $I_1$ of the trailer 260 include 10% errors. Referring to FIG. 19, even though the mass $m_1$ and yaw moment of inertia $I_1$ of the trailer 260 include errors, and even though noise is superimposed on the output signal of the yaw rate sensor 720, the difference between the solid and dashed lines fall within those corresponding to 10% errors. Thus, it can be understood that the discrete-time Kalman filter satisfactorily functioned.

Next, using the side-slip angle β calculated as above, the side-slip angle of each tire of the tractor 220 that is coupled to the trailer 260 will be calculated. In the physical model for the tractor 220 as shown in FIG. 20, assume that the front tire tread is $d_f$, the outer rear tire tread is $d_{ro}$, the inner rear tire tread is $d_{ri}$, the distance between the front axle and gravitational center of the vehicle body is $1_f$, and the distance between the rear axle and gravitational center of the vehicle body is $1_r$. Then, the side-slip angle $\beta_{f1}$ of the left front tire and the side-slip angle $\beta_{f2}$ of the right front tire may be calculated by the following formulas:

$$\beta_{f1} \approx \frac{V\beta + l_f r}{V - \frac{d_f r}{2}} \quad \text{[Math. 17]}$$

$$\beta_{f2} \approx \frac{V\beta + l_f r}{V + \frac{d_f r}{2}}$$

The side-slip angle $\beta_{r1}$ of the outer left rear tire, the side-slip angle $\beta_{r2}$ of the inner left rear tire, the side-slip angle $\beta_{r3}$ of the inner right rear tire, and the side-slip angle $\beta_{r4}$ of the outer right rear tire may be calculated by the following formulas:

$$\beta_{r1} \approx \frac{V\beta - l_r r}{V - \frac{d_{ro} r}{2}} \quad \text{[Math. 18]}$$

$$\beta_{r2} \approx \frac{V\beta - l_r r}{V - \frac{d_{ri} r}{2}}$$

$$\beta_{r3} \approx \frac{V\beta - l_r r}{V + \frac{d_{ri} r}{2}}$$

$$\beta_{r4} \approx \frac{V\beta - l_r r}{V + \frac{d_{ro} r}{2}}$$

When the vehicle 200 is a tractor as described above, the side-slip energy E may be calculated by the following equation using the side-slip angle of each tire and be used as a warning sign of failure of the tire.

$$E_{ik} = \int \frac{m}{6} V \beta_{ik} dt \quad \text{[Math. 19]}$$

When the vehicle 200 is a semi-trailer truck as described above, the side-slip energy E of the tractor 220 may be calculated by first estimating the side-slip angle δ at the gravitational center of the tractor 220 using the discrete-time Kalman filter, and then by calculating the side-slip angle of each tire using the thus-estimated side-slip angle δ at the gravitational center of the tractor 220.

REFERENCE SIGNS LIST 340 control unit
380 radio unit
700 steering angle sensor
720 yaw rate sensor
740 vehicle speed sensor
760 engine control unit

The invention claimed is:

1. A tire failure detection device comprising:
a steering angle sensor for sensing a steering angle;
a yaw rate sensor for sensing a yaw rate; and
a control unit, wherein
the control unit calculates side-slip energy based on an output signal of the steering angle sensor and an output signal of the yaw rate sensor, and
the control unit determines that a failure has occurred in a tire when the side-slip energy exceeds a first threshold.

2. The tire failure detection device according to claim 1, wherein
the control unit calculates a side-slip angle based on the output signal of the steering angle sensor and the output signal of the yaw rate sensor, and
the control unit calculates the side-slip energy by integrating the side-slip angle.

3. The tire failure detection device according to claim 2, wherein the control unit calculates the side-slip angle by subtracting, from a value obtained by applying a first low-pass filter to the output signal of the steering angle sensor, a value obtained by applying a second low-pass filter to the output signal of the yaw rate sensor.

4. The tire failure detection device according to claim 2, wherein the control unit calculates the side-slip energy when an absolute value of the side-slip angle is greater than a predetermined angle.

5. The tire failure detection device according to claim 1, wherein the control unit calculates the side-slip energy in consideration of a vehicle weight and a vehicle speed.

6. The tire failure detection device according to claim 1, further comprising
a radio unit for external radio communication,
wherein, when the control unit determines that a failure has occurred in the tire, the control unit externally communicates occurrence of the failure via the radio unit.

7. The tire failure detection device according to claim 6, wherein the control unit updates the first threshold in accordance with data externally received via the radio unit.

8. The tire failure detection device according to claim 1, wherein, when the side-slip energy exceeds a second threshold, which is greater than the first threshold, the control unit transmits an output power reduction command to an engine control unit for electronically controlling an engine.

9. A tire failure detection method comprising causing a control unit that is capable of retrieving an output signal of a steering angle sensor for sensing a steering angle, and an output signal of a yaw rate sensor for sensing a yaw rate to:
calculate side-slip energy based on the output signal of the steering angle sensor and the output signal of the yaw rate sensor; and
determine that a failure has occurred in a tire when the side-slip energy exceeds a first threshold.

10. The tire failure detection method according to claim 9, wherein
the control unit calculates a side-slip angle based on the output signal of the steering angle sensor and the output signal of the yaw rate sensor, and
the control unit calculates the side-slip energy by integrating the side-slip angle.

11. The tire failure detection method according to claim 10, wherein the control unit calculates the side-slip angle by subtracting, from a value obtained by applying a first low-pass filter to the output signal of the steering angle sensor, a value obtained by applying a second low-pass filter to the output signal of the yaw rate sensor.

12. The tire failure detection method according to claim 10, wherein the control unit calculates the side-slip energy when an absolute value of the side-slip angle is greater than a predetermined angle.

13. The tire failure detection method according to claim 9, wherein the control unit calculates the side-slip energy in consideration of a vehicle weight and a vehicle speed.

14. The tire failure detection method according to claim 9, wherein, when the control unit determines that a failure has occurred in the tire, the control unit externally communicates occurrence of the failure via a radio unit for external radio communication.

15. The tire failure detection method according to claim 14, wherein the control unit updates the first threshold in accordance with data externally received via the radio unit.

16. The tire failure detection method according to claim 9, wherein, when the side-slip energy exceeds a second threshold, which is greater than the first threshold, the control unit transmits an output power reduction command to an engine control unit for electronically controlling an engine.

17. A non-transitory computer-readable storage medium recording a tire failure detection program for causing a computer to perform the steps of:

calculating side-slip energy based on a steering angle and a yaw rate; and determining that a failure has occurred in a tire when the side-slip energy exceeds a threshold.

* * * * *